(12) United States Patent
Vecchione et al.

(10) Patent No.: US 8,852,826 B2
(45) Date of Patent: Oct. 7, 2014

(54) POROUS COMPOSITE PRODUCT FOR THE PRODUCTION OF A CATALYTIC LAYER, IN PARTICULAR IN FUEL CELL ELECTRODES

(75) Inventors: Raffaele Vecchione, Naples (IT); Salvatore Leonardi, Aci S. Antonio (IT); Giuseppe Mensitieri, Naples (IT); Anna Borriello, Portici (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1216 days.

(21) Appl. No.: 12/126,082

(22) Filed: May 23, 2008

(65) Prior Publication Data

US 2008/0292934 A1    Nov. 27, 2008

(30) Foreign Application Priority Data

May 24, 2007    (IT) .............................. MI2007A1058

(51) Int. Cl.
*H01M 8/10* (2006.01)
*H01B 1/12* (2006.01)
*H01B 1/04* (2006.01)
*H01M 4/92* (2006.01)
*H01M 8/02* (2006.01)

(52) U.S. Cl.
CPC ....... *H01B 1/124* (2013.01); H01M 2008/1095 (2013.01); *H01M 4/921* (2013.01); *H01B 1/04* (2013.01); *H01M 8/1002* (2013.01); H01M 8/1004 (2013.01); Y02E 60/521 (2013.01); *H01M 4/926* (2013.01); H01M 8/0291 (2013.01)
USPC ........................... 429/479; 429/483; 429/492

(58) Field of Classification Search
None
See application file for complete search history.

(56) References Cited

U.S. PATENT DOCUMENTS 7,625,650 B2 * 12/2009 Kim et al. ..................... 429/494
7,722,981 B2 * 5/2010 Jang et al. ..................... 429/493
2004/0248162 A1 * 12/2004 Cuppoletti et al. ............... 435/6
2005/0266980 A1 * 12/2005 Mada Kannan et al. ...... 502/101

* cited by examiner

*Primary Examiner* — Melissa Stalder
(74) *Attorney, Agent, or Firm* — Allen, Dyer, Doppelt, Milbrath & Gilchrist, P.A.

(57) ABSTRACT

A composite product is for an electrode of a fuel cell including a catalyst, an electrically conductive phase which supports such catalyst, a protonically conductive phase, and a porous phase. At least the contact between the catalyst and the electrically and protonically conductive phases, and preferably also the contact of the porous phase with the catalyst and with the electrically and protonically conductive phases, is improved or maximized. Each of the phases is individually continuous, and such phases are continuous with each other.

5 Claims, 3 Drawing Sheets

- PROTONICALLY CONDUCTIVE PHASE    
- POROSITY    
- ELECTRONICALLY CONDUCTIVE PHASE    
- CATALYST

- PROTONICALLY CONDUCTIVE PHASE 
- POROSITY 
- ELECTRONICALLY CONDUCTIVE PHASE 
- CATALYST

POROUS COMPOSITE PRODUCT FOR THE PRODUCTION OF A CATALYTIC LAYER, IN PARTICULAR IN FUEL CELL ELECTRODES

FIELD OF THE INVENTION

The present invention generally relates to a porous composite product, in particular, but not exclusively, for the production of a catalytic layer suitable to be used in fuel cell electrodes.

BACKGROUND OF THE INVENTION

A fuel cell is an electrochemical generator that converts chemical energy into electrical energy and that, similar to internal combustion generators, may not require recharging, but rather fuel. A Polymer Electrolyte Membrane Fuel Cell (PEMFC) is a particular type of fuel cell that is well suited for portable applications and which has therefore been quickly developed over the last few years.

One such cell type may advantageously be capable of working in a satisfactory manner even at low temperatures, and moreover may have a good capacity for cold starting in short times. Fulfilling such characteristics may involve the use of catalysts capable of activating, at low temperatures, the chemical reactions which involve the fuel, and which may be constructed from expensive materials, for example, platinum.

The catalyst has primary importance in the functioning of the fuel cell. In particular, the greater the exploitation of the catalyst, the greater the performance of the fuel cell in terms of quantity of current supplied and in the decrease of related costs.

A good catalyst may have a high dispersion coefficient, which is defined as the ratio between the number of surface atoms and the number of total atoms of the catalyst. The higher the ratio, the more efficiently the catalyst is exploited, since the available surface area for the reactions is greater.

In the case of a fuel cell, however, the situation is complicated due to the fact that there are additional factors which affect the catalyst utilization efficiency, as will be explained below with reference to the structure and functioning of a Polymer Electrolyte Membrane Fuel Cell or PEMFC. In detail, the functioning of a PEMFC is essentially assured by two electrodes, anode and cathode, where the electrochemical reactions occur that generate electricity, and by an electrolyte with the function of transporting ions (protons) from the anode to the cathode, which in this specific case may be a polymer membrane.

The fuel is generally hydrogen or methanol which by chemically reacting produces electricity and, as reaction products, water and possibly carbon dioxide depending on the fuel used. The reactions which take place at the electrodes, in the case of hydrogen fuel cells, include:

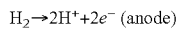
$H_2 \rightarrow 2H^+ + 2e^-$ (anode)

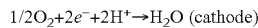
$1/2 O_2 + 2e^- + 2H^+ \rightarrow H_2O$ (cathode)

while in the case of direct methanol fuel cells, of:

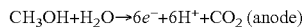
$CH_3OH + H_2O \rightarrow 6e^- + 6H^+ + CO_2$ (anode)

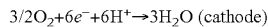
$3/2 O_2 + 6e^- + 6H^+ \rightarrow 3H_2O$ (cathode)

The assembly comprising the electrodes and the electrolyte membrane—MEA (Membrane Electrode Assembly)—for a cell of the above type is schematically represented in FIG. 1. The (polyelectrolyte) polymer membrane is arranged between the two electrodes and has the dual function of electrically isolating the anode and cathode, and of making the protons, developed at the anode, pass through it, so that the electrons can be provided to an external load to then be used up together with the protons once they have reached the cathode.

The two electrodes in turn comprise a catalytic layer in direct contact with the membrane and a diffusive layer. In brief, the diffusive layer supports the catalytic layer and acts as collector of the electrons developed in the latter and diffuser of the chemical reagents, as can be noted with reference to FIG. 1. The diffusive layer may be hydrophobic to avoid the absorption of water by the polymer membrane and, specifically by the cathode, to favor the flow of the water produced during the respective electrochemical reaction. Therefore, to acquire hydrophobic properties, the diffusive layer is generally treated with Teflon.

Alternatively, it is also possible to introduce a hydrophobic and conductive layer, typically including Teflon and Carbon Black (CB), between the catalytic layer and the diffusive layer, as illustrated in FIG. 2, in which a graphite diffusive layer is represented. The catalytic layer, on the other hand, contains the catalyst that generally is in the form of particles supported by an electrically conductive filler.

In particular, the catalyst may be made of different metals than the two electrodes, which preferably comprise platinum or platinum alloys with cobalt or chromium for the cathode electrode, and of ruthenium, rhodium, iridium, palladium, platinum and their alloys for the anode electrode. The electrically conductive filler generally includes a Carbon Black filler and forms an electronic transport phase or electrically conductive phase to provide the catalytic layer with the capacity to conduct electrons involved in the electrochemical reactions.

The catalytic layer also comprises a proton transport phase (electrolyte phase) which allows the protons generated at the anode to flow toward the electrolyte membrane, and then to the cathode. Typically, the proton transport phase comprises the same material as the electrolyte membrane, to favor the integration with the membrane itself.

Moreover, the catalytic layer may hopefully be equipped with a certain porosity, such that the flow of fuel to the anode and oxygen to the cathode is favored. Overall, the porosity forms that which is defined as the porous phase. In other words, the catalytic layer may favor the transport of the reagents, which is more effective the more it occurs through the porous phase, the (ionic) proton transport through the protonically conductive phase and the electronic transport via the electron conductive phase.

Therefore, the efficiency of the fuel cell is related to the interaction that the phases have with the catalyst and to the continuity which these have inside the catalytic layer. Substantially, then, the more there is simultaneous contact, in the catalytic layer of an electrode, between the porous phase, the protonically conductive phase and the electrically conductive phase supporting the catalyst, the more the cell works efficiently. To form the catalytic layer, the prior art provides several processes, briefly described below.

A first process provides the making of a catalyst ink obtained by mixing specific quantities of conductive filler supporting the catalyst, of solvent and of polymer forming the membrane. The ink is then transferred by painting techniques or by spray onto a Teflon or other material support capable of releasing the ink itself in the form of a solid ink layer.

Such solid ink layer is then applied, that is, deposited on, the electrolyte membrane or the diffusive layer by hot pressing. Moreover, in the mixing, one or more agents adapted to favor the formation of the porosity (pore-forming agents) are generally added, which are removed during or after the deposition of the catalyst ink layer, by means of a heat or washing treatment. As pore-forming agent, a soluble and/or removable polymer for heat treatment can be used, for example polysaccharides and polyethylene glycols, or a salt such as a carbonate, being also removable by washing.

One drawback of this process is the fact that the application, by means of hot pressing, of the catalytic layer (solid ink layer) to the electrolyte membrane or to the diffusive layer may involve an undesired decrease of the porous phase, in particular in the case of pore-forming agents removed during the application of the catalytic layer itself. The heat applied in the process in fact leads to a partial melting of the polymer portion of the catalytic layer, which is compacted by the pressure applied with the increase of the overall density.

The increase of the density occurs to the detriment of the channels useful for the diffusion of the reagents, that is, the pores, which are reduced. It should be noted that such drawback is confined to the porous phase, i.e. to the diffusion of the reagents, while the densification is desirable with regard to the proton transport phase, since it favors the adhesion of the catalytic layer itself to the polyelectrolyte membrane.

In case of pore-forming agents removed after the deposition of the catalytic layer, the porous phase obtained, even if improved with respect to that described above, may not be optimal since there is a random distribution of the pores inside the catalytic layer itself. The random distribution of the pores may not ensure a sufficient contact, in terms of cell performance, among the three transport phases, respectively of reagent, electron and proton transport phases with the catalyst particles. Moreover, it should be added that the treatments for removing the pore-forming agents can damage the catalyst.

To overcome the drawback related to the densification, other catalytic layer application techniques were developed, such as for example molding, painting, and spray, which more greatly preserve the porous phase and which thus may not adversely affect the diffusion of the reagents. These techniques, however, may lead to a reduction of the interaction between the catalytic layer and the polymer electrolyte membrane, with a consequent decrease of the proton exchange.

Overall, therefore, the production processes of a catalytic layer for electrodes of a fuel cell described above may have the effect of favoring the transport of the reagents over the proton transport, or vice versa, depending on the heat and the pressure applied, involving an undesired limitation of the efficiency of the catalytic layer itself.

That set forth above is reported in the example of FIG. 3, where a limited use of the catalyst is illustrated, which results effective near the surface of the catalytic layer. Moreover, it should be observed that the more the thickness of the catalytic layer is increased for increasing the catalyst filler and thus the electrode performances, the more the issue occurs.

To overcome the above drawback related to the excessive or insufficient densification of the catalytic layer, the prior art has developed an embodiment variant of the above-described process, in which a "multiple" catalytic layer is made through the overlapping of several catalyst ink layers applied with different pressures and which therefore form different layers with individual densities.

In practice, after the application of a first ink layer, which forms a first denser portion of the multiple catalytic layer to favor its interaction with the electrolyte layer, subsequent individual layers of catalyst ink are applied, hot but with decreasing pressures. In this manner, the individual layers have increasing porosity as one moves away from the electrolyte membrane and moves closer to the diffusive layer, and consequently the transport of the reagents towards the catalyst particles is favored in such layers.

Generally, then, the last layer may be applied by means of painting, spray or other so-called "pressure free" techniques, that is, without exerting pressure in the application operation of the individual catalyst ink layer. Even if advantageous, such an embodiment may still have drawbacks, the main one of which is the fact that the contact between the three phases, that is, the contact between porous phase, protonically conductive (electrolyte) phase, and electrically conductive phase supporting the catalyst, may be merely partially improved.

In substance, the porous and proton transport phases may not have a corresponding progression along the multiple catalytic layer, i.e. they may not be improved in parallel. In other words, along the thickness of the multiple catalytic layer, the contact between the proton transport phase and the porous phase may not be uniformly improved since, if one considers the different density portions of the multiple catalyst layer, one obtains a diminution of the proton transport capacity with an increase of the porous phase, and vice versa.

It should moreover be added that the integration between the catalytic layer and the electrolyte membrane can also be improved through the use of a binder of known type, such as for example polyethylene, polypropylene, polycarbonate, polyamide and similar binding agents. In such case, the binder is initially added to the starting mixture which forms the catalyst ink. The binders are generally used when the polymer forming the electrolyte membrane may not be soluble in the solvent used in the starting mixture. It should be observed that one such expedient produces an improvement in the contact between the proton transport phase and the electron transport phase.

According to further embodiments of the above-described process, the contact between the proton transport phase and the electron transport phase can also be improved through surface treatments of the Carbon Black, which as reported above is generally used as electrically conductive filler supporting the catalyst. Such treatments are directed to making the Carbon Black more hydrophilic. A poorly hydrophilic conductive filler, in fact, may be disadvantageous both in terms of the fuel access and the transfer of the protons toward the polyelectrolyte phase.

Such treatments provide the modification of the surface polarity through the use, for example, of silica, of polar organic groups or by conductor polymers having heteroatoms along the chain such as nitrogen (N), oxygen (O) or sulphur (S). In the latter case, the overall electronic conductivity of the catalytic layer may also be improved, but the overall improvement regards the contact of the catalyst with the electronic transport phase and with the proton transport phase, since the porosity inside the catalytic layer remains randomly distributed. Moreover, the long radius continuity of the individual phases, that is, the uniformity of each phase inside the catalytic layer, may not be ensured, and hence an effective transport of the reagents, protons and electrons may not be ensured.

In a further process provided by the prior art, the production of a catalytic layer of an electrode in a fuel cell provides a so-called "ink-jet" deposition phase which may allow a speeding up of the process of the actual deposition of the catalytic layer with respect to hot pressing techniques. The processes which such ink-jet technique adopts may be carried out continuously and may allow making a pattern with high precision, but they may not resolve the problem related to the efficient use of the catalyst. Such technique, in fact, may have the same drawbacks and limits observed in the case of deposition of the catalytic layer by means of painting or spray.

In other words, even with the use of the ink-jet technique, a poor interaction may be obtained between the catalytic layer and the polymer membrane, with consequent diminution of the proton exchange. Moreover, even the processes of more recent development, such as electrodeposition and sputter deposition, although advantageous, may be applied in the making of very thin catalytic layers, and therefore regard the making of low power fuel cells.

SUMMARY OF THE INVENTION

The present invention provides an approach for improving the exploitation of a catalyst inside a catalytic layer of an electrode for a fuel cell.

In particular, the quantity of catalyst used in a catalytic layer of the aforementioned type is enhanced, overcoming the abovementioned drawbacks, by virtue of a more effective localization and hence interaction of the phases which make up the catalytic layer.

In brief, a first object is to form a catalytic layer for an electrode of a fuel cell comprising a catalyst, an electrically conductive phase, which supports such catalyst, a protonically conductive phase and a porous phase. At least the contact between the catalyst and the electrically and protonically conductive phases may be enhanced or maximized i.e. each of the electrically conductive and protonically conductive phases may be a continuous phase, and the electrically and protonically conductive phases may be continuous with each other.

A second object is to form a catalytic layer. The contact of the porous phase with the catalyst and with the other two phases, electrically conductive and protonically conductive, respectively, is improved. The porous phase may have a programmed and non-random distribution, i.e. the porous phase may also be an individually continuous phase and co-continuous with the electrically conductive phase.

These and further objects are achieved by a composite product, particularly suitable for use in the production of the catalytic layer of fuel cell electrodes. The composite product may include a polymer matrix, an electrically conductive filler, and at least one redox catalyst. The composite product is provided with a predetermined porosity. The polymer matrix comprises at least one first continuous polymer and protonically conductive phase, which is obtained from a respective co-continuous polymer system. The electrically conductive filler realizes a respective electrically conductive continuous phase that is co-continuous with the first continuous polymer phase. The electrically conductive continuous phase may be arranged on a surface of the continuous polymer phase corresponding to the interface surface of the co-continuous polymer system. The catalyst is dispersed or supported in the electrically conductive filler.

In practice, this approach uses a co-continuous polymer system from which the composite product is obtained. By co-continuous polymer system, it is intended to mean a polymer system comprising at least two distinct polymer phases, each of the two polymer phases being a continuous phase and the two continuous phases being co-continuous with each other through a co-continuity interface. Co-continuous polymer systems may be made by a mixture of at least two immiscible polymers or by at least one amphiphilic block copolymer, as will be better described in the description below.

In substance, this approach provides a composite and porous product of the above-considered type, and a related production process and its use in particular for catalytic layers of fuel cell electrodes where the composite and porous product are obtained from a co-continuous polymer system as defined above. The co-continuous polymer system comprises at least two polymer phases, in which a first phase is protonically conductive or susceptible for becoming such. The composite product also comprises an electrically conductive filler supporting the catalyst arranged at the interface of the two polymer phases, the second phase being preferably removable for the creation of the desired localized porosity.

BRIEF DESCRIPTION OF THE DRAWINGS

Further characteristics and advantages will be clearer from the detailed description, accompanied by several embodiment examples of such a composite and porous product, made below with reference to the attached drawings provided for illustrative and non-limiting purposes. In such drawings.

DETAILED DESCRIPTION

Figure 1:
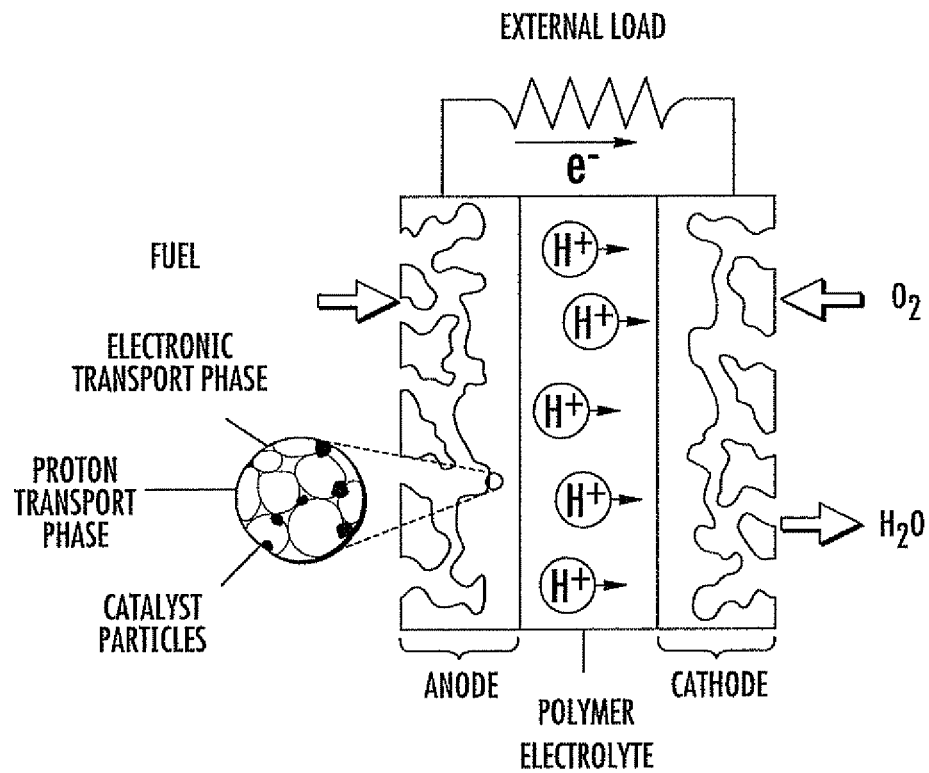
FIG. 1 is a schematic diagram of the assembly of components of a portion of a Polymer Electrolyte Membrane fuel cell comprising two electrodes and an electrolyte membrane, in accordance with the prior art.
Figure 2:
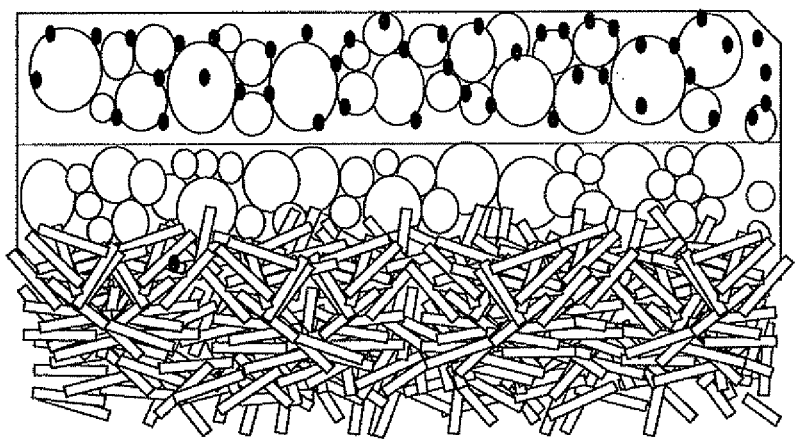
FIG. 2 is a schematic diagram of a portion of an electrode of a fuel cell of the type illustrated in FIG. 1 in which a hydrophobic layer is interposed between a catalytic layer and a diffusive layer, in accordance with the prior art.
Figure 3:
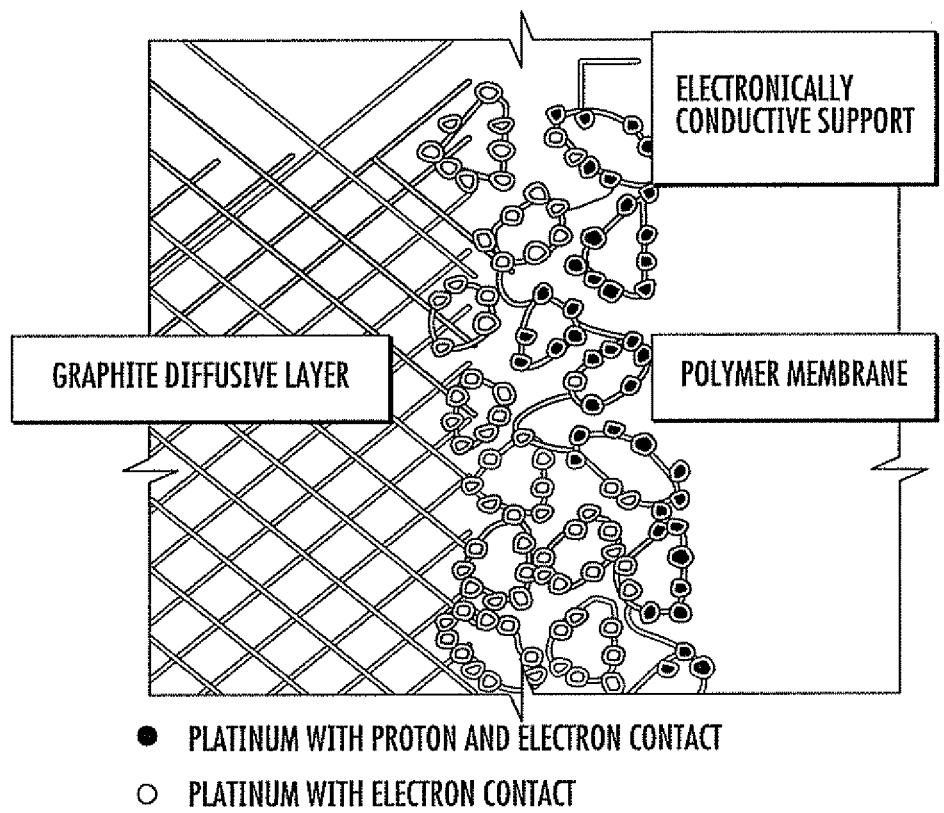
FIG. 3 is a schematic diagram in which a limited exploitation is illustrated of a catalyst in a fuel cell of the type illustrated in FIG. 1, in accordance with the prior art.
Figure 4:
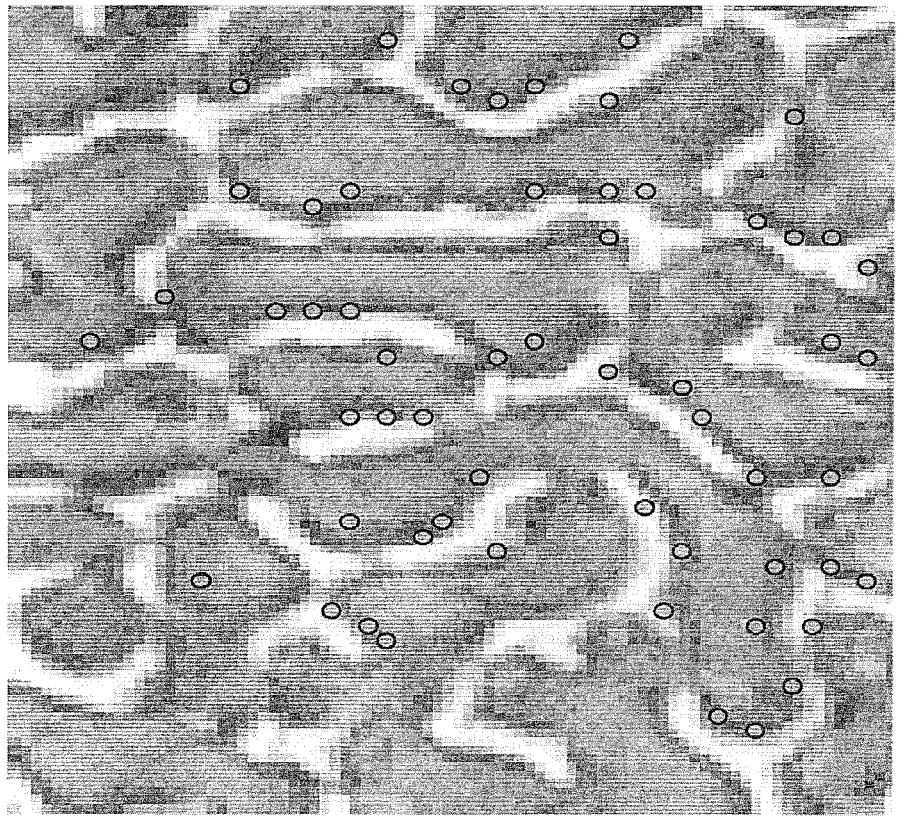
FIG. 4 is a schematic diagram of a composite and porous product, according to the present invention.
Figure 4:
Figure 4:
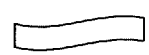
Figure 4:
Figure 4:

Referring to FIG. 4, a composite product comprises a polymer matrix, an electrically conductive filler, and at least one redox catalyst. The composite product is provided with a predetermined porosity. The polymer matrix comprises at least a first continuous and protonically conductive polymer phase obtained from a respective co-continuous polymer system. The electrically conductive filler forms a respective continuous electrically conductive phase, which is co-continuous with the first continuous polymer phase and is arranged on a surface of the latter corresponding with the interface surface of the co-continuous polymer system. The catalyst is dispersed in, or supported by, the electrically conductive filler. This porous composite product is particularly suitable for realizing catalytic layers of fuel cell electrodes.

In certain embodiments, the composite and porous product may be obtained from a co-continuous polymer system of the type made by the mixture of immiscible polymers. Co-continuous polymer systems of this type are generated when at least two immiscible polymers are blended to form a blend. The two immiscible polymers may each form a respective continuous phase, and form two co-continuous phases, i.e. rendered continuous by a continuity interface.

The typical size of the microdomains of the smaller phase in the larger phase equates to a few microns. Such systems may not be in equilibrium, so that the size of the microdomains depends on the conditions of the system itself. In practice, a similar system may be obtained by quick cooling. This includes starting from a polymer casting, or by quick evaporation of the solvent when starting from a solution of two polymers. In detail, in the case of an immiscible polymer blend processed from a solution, the porous composite product may be obtained as follows.

One starts from a mixture comprising two immiscible polymers. The immiscible polymers include an electrically conductive filler already supporting particles of a redox catalyst in its surface, a solvent, and possible pore-forming agents. The electrically conductive filler may comprise Carbon Black, carbon nanotubes, electrically conductive polymer powders, and also mixtures of different filler types. Polymers that have intrinsic electronic conductivity comprise, for example, polyacetylene, polyaniline, and polypyrrole.

The composition of the two polymers in the mixture is chosen so that each of the two polymers may succeed in forming a continuous phase inside the other. The mixture is deposited from a solution form by performing quick evaporation of the solvent to freeze the co-continuity of the two polymer phases. The two polymers are chosen such that the first may be protonically conductive, or susceptible to become such via a subsequent treatment. The second is a polymer that may be selectively removed, for example, eliminated via ozonolysis or UV treatment, or by both of the above. The phase intended for proton transport (protonically conductive) represents 10-90% of the blend composition, preferably 30-60%.

The conductive filler, due to the particular nature of the co-continuous polymer system, preferentially arranges itself at the interface of the polymer system, that is, between the two polymer phases, by improving or maximizing the simultaneous contact/interaction of the catalyst with the electron transport phase and with the proton transport phase. It should be noted that systems of co-continuous polymers may permit the reduction of the quantity of conductive filler necessary for making the polymer electrically conductive. This is due to the tendency of the conductive filler arranging itself at the interface of the phases of such systems, forming electrically conductive percolating paths.

An electronic conductivity is observed for filler values from 0.4% by weight. The reduction of the filler quantity may have the advantage of decreasing the fragility of the composite product, the electrical properties being equal.

The porosity of the composite product may then be obtained by removing the pore-forming agents, in accordance with that described for the prior art, and/or by selective removal of the second polymer. The removal of the second polymer (second polymer phase) occurs via the use of an appropriate solvent, for example, in case of a blend constituted by s-PS as first polymer and by PI as second polymer it can be obtained via n-heptane. The removal determines the formation of a continuous porosity, localized in contact with the electrically conductive filler, thus with the catalyst and with the protonically conductive phase.

In another embodiment, the catalyst may be inserted after the creation of the porosity by removal of the second polymer, for example, by electrodeposition. In another embodiment where the electronic filler is mixed with the two polymers, the electronic transport in the composite product according to the present embodiments may also be obtained through a metallizing of the walls of the continuous and localized porosity.

In accordance with another embodiment, the co-continuous polymer system of immiscible polymers can also be obtained by casting. In such embodiments, one starts from powders of granules of two immiscible polymers in a suitable composition, according to the above considered example to which reference is made. The polymers are homogenized inside a mixer at a temperature greater than that of the vitreous transition temperature together with conductive filler, for example, particles of Carbon Black or particles of conductive polymers (possibly also mixing pore-forming agents). Once the mixture is homogenized, it can be rolled together with an electrolyte membrane of a fuel cell, to integrate it before solidification.

Also in this case, the conductive filler may be arranged at the interface of the two polymer phases, each continuous and continuous with each other. Then, still analogous to that previously set forth in reference to the blend of immiscible polymers obtained from the solution, the porosity may be obtained through the removal of the pore-forming agents (if contained in the initial mixture) and/or through the selective removal of the second polymer phase.

The porosity obtained in case of removal of the second polymer phase is advantageously a continuous porosity, co-continuous with the first polymer, which is the intrinsically protonically conductive polymer or which can be made such via a subsequent treatment. Such polymer and porous phases are moreover co-continuous even with the electrically conductive phase, the latter having been obtained at the interface of the two starting co-continuous polymers phases. Also in this case, it should be noted that the catalyst can already be contained on the surface of the electrically conductive filler or it can be electrodeposited after the removal of the second continuous polymer phase, which creates the porosity.

In the other embodiments, the porous composite product is obtained from a co-continuous polymer system of the type made from at least one amphiphilic block copolymer, i.e. comprising at least two blocks with different polarities. In brief, the amphiphilic block copolymers (ABCs) are self-assembling polymers in the sense that it is possible to program their structure. This characteristic is due to the different polarity of the blocks which constitute the polymer chain, determining a microsegregation phase of the same blocks.

The typical sizes of the microdomains are 10-100 nm, which is a function of the molecular weight of the polymer and can be varied as desired. The structure of one such copolymer is an equilibrium structure, which can have various morphologies as a function of the ratio between the lengths of the single blocks.

For example, in the case of amphiphilic copolymer with two blocks, for a percentage ratio between the lengths of the two blocks less than 21%, the smaller phase is microsegregated to form small spheres, which may be organized according to a cubic structure with centered body. For percentages in the range of 21-33%, cylinders may be obtained which may be organized according to a hexagonal structure. In the range of 33-37%, co-continuous phases are obtained, and finally in the range of 37-50%, the organization may be of a lamellar type.

In the case of co-continuous structures, the smaller phase may form continuous channels inside the matrix formed by the larger phase. Also, with a co-continuous polymer system obtained from an amphiphilic block polymer, the polymer system can be processed either from a casting or a solution.

In case the system is based upon a solution, the process starts from a block copolymer formed by at least two polymers, of which one is intrinsically proton transport capable or can become such through a subsequent treatment. The composition is in the range which ensures the co-continuity of the two phases, i.e. in the range of 33-37% of one of the two polymer blocks with respect to the other. The conductive filler is inserted into the solution. The filler may comprise Carbon Black, or particles of conductive polymers. Also, pore-forming agents may be added.

The system is then deposited by way of a slow evaporation of the solvent. In this case, the co-continuous structure is an equilibrium structure since the two polymer blocks are chemically bound, and thus may spontaneously microsegregate into two co-continuous phases.

The catalyst can be previously deposited on the electrically conductive filler or it can be electrodeposited following the removal of the second polymer, which can be obtained via ozonolysis or UV or both. The porosity of the composite product is then obtained via the removal of the pore-forming agents and/or by removal of the second polymer phase.

In case where the system is processed from a casting, one starts from powder or granules of a block copolymer comprising at least two polymers, of which one is a proton transport capable polymer or such to become protonically conductive through a subsequent treatment. The composition of the copolymer is in the range that ensures the co-continuity of the two phases, i.e. in the range of 33-37% of one of the two polymer blocks with respect to the other.

The co-polymer is mixed with the conductive filler and possibly with the pore-forming agents inside a mixer. The conductive filler can be Carbon Black or particles of conductive polymers. Once homogenized, the mixture is rolled on the electrolyte membrane to integrate it before solidification.

In accordance with other embodiments, the formation of the porosity is performed via removal, if initially provided, of the pore-forming agents and/or of one of the two polymers, which is a block of the copolymer. In case of removal of such copolymer block, the porosity is co-continuous with the remaining block, i.e. co-continuous with the proton transport polymer phase and co-continuous with the electrically conductive phase, this being arranged at the interface of the two starting polymer blocks. Also in this case, the catalyst may already be contained in the surface of the electrically conductive filler or it can be electrodeposited after the removal of the polymer block which creates the porosity.

It should be added that in the case of electrically conductive filler including Carbon Black, a surface treatment of the Carbon Black can be provided to increase its hydrophilic nature and/or electronic conductivity and/or capacity to transfer protons to the electrolyte phase. Moreover, it is useful to observe that the porosity can be obtained via pore-forming agents during or after the deposition of the catalytic layer, via heat treatment or washing, or by incorporating, in the plasticizing step of the proton transport polymer phase, carbon dioxide or any one other gas which, by subsequent quick extraction, creates porosity. Alternatively or in addition to this step, this porosity can be achieved also through selective removal of the smaller phase of the co-continuous polymer system.

The advantages of the present system, already evident during the present description, include the possibility of making a composite and porous product which is, in particular, recommended for being employed as catalytic layer of fuel cell electrodes in which they are co-continuous with each other. This may improve contact with the catalyst, at least in the case of the proton transport phase and the electron transport phase.

Advantageously and in some embodiments, three phases in the catalytic layer are continuous, i.e. the protonically conductive phase, the electrically conductive phase, and the porous phase for the transport of the reagents are continuous, which are each in contact with the catalyst. In this manner, the quantity of the requested catalyst, performance being equal, can be enormously reduced with respect to that required in the catalytic layers made with conventional techniques.

It should also be noted that since the coupling of the three phases (proton transport phase, electron transport phase and porous phase) occurs in parallel, an increase in the thickness of the catalytic layer and thus of the quantity of catalyst corresponds a proportional increase in the electrode performance in terms of quantity of supplied current, contrary to the conventional catalytic layer production techniques. Also, the individual capacities of proton, electron and reagent transport are increased, since the structure ensures a greater continuity of each of the three phases.

That which is claimed is:

1. A method for making a composite product for a catalytic layer of an electrode of a fuel cell, the method comprising:
   forming a co-continuous polymer system comprising a plurality of polymers being immiscible with respect to each other, the co-continuous polymer system comprising at least one first protonically conductive continuous polymer phase, at least one second continuous polymer phase, and at least one interface therebetween;
   removing the at least one second continuous polymer phase from the co-continuous polymer system to define a plurality of pores in the at least one first protonically conductive continuous polymer phase; and
   forming an electrically conductive phase comprising at least one electrically conductive filler and at least one redox catalyst, the at least one redox catalyst being supported in and dispersed throughout the at least one electrically conductive filler, the at least one interface surrounding the plurality of pores in the co-continuous polymer system, the electrically conductive phase being a continuous phase formed on a surface of the at least one first protonically conductive continuous polymer phase corresponding to the interface of the co-continuous polymer system.

2. A method according to claim 1 further comprising defining a level of porosity for the co-continuous polymer system by at least adding at least one pore-forming agent to the co-continuous polymer system.

3. A method according to claim 1 wherein the at least one electrically conductive filler is at least one of added to the co-continuous polymer system and electrodeposited at the interface.

4. A method according claim 1 wherein the forming of the co-continuous polymer system comprising the at least one first protonically conductive polymer phase comprises forming the at least one first protonically conductive continuous polymer phase from an intrinsically protonically conductive polymer.

5. A method according claim 1 wherein the forming of the co-continuous polymer system comprising the at least one first protonically conductive polymer phase comprises forming the at least one first protonically conductive continuous polymer phase from a polymer and treating the polymer to make the polymer protonically conductive.

* * * * *